No. 775,012. PATENTED NOV. 15, 1904.
J. H. McLEAN.
SAW TEETH.
APPLICATION FILED JAN. 18, 1904.
NO MODEL.
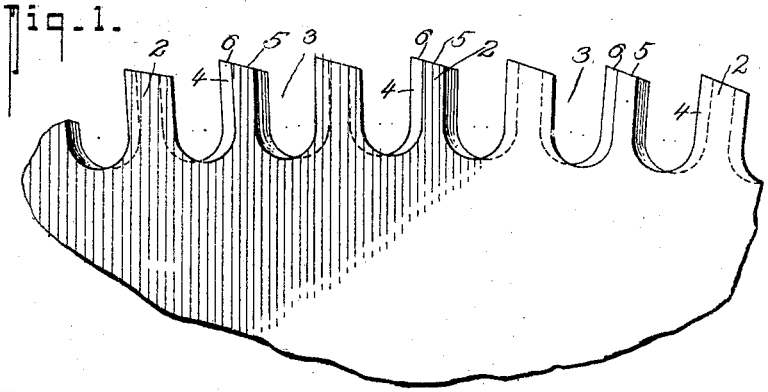
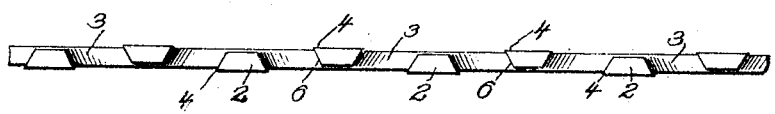
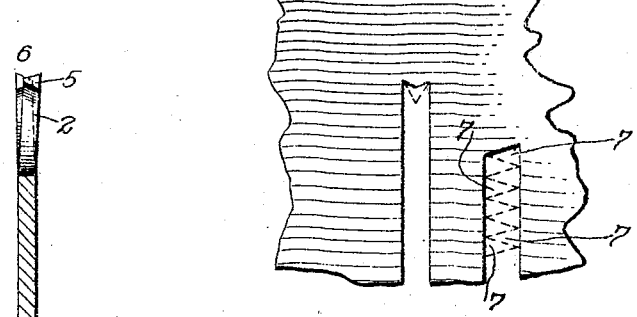
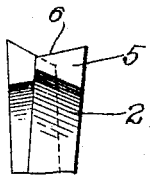
WITNESSES:
John T. Schrott
F. C. Gibson
INVENTOR
John H. McLean.
BY
Fred G. Dieterich
ATTORNEY.

No. 775,012.

Patented November 15, 1904.

UNITED STATES PATENT OFFICE.

JOHN H. McLEAN, OF VANCOUVER, CANADA.

SAW-TEETH.

SPECIFICATION forming part of Letters Patent No. 775,012, dated November 15, 1904.

Application filed January 18, 1904. Serial No. 189,478. (No model.)

*To all whom it may concern:*

Be it known that I, JOHN H. MCLEAN, a citizen of the Dominion of Canada, residing at the city of Vancouver, in the Province of British Columbia, Canada, have invented a new and useful Improvement in Saw-Teeth, of which the following is a specification.

My invention relates to improvements in the manner of shaping and grinding the teeth of "cut-off saws," and is directed to the attainment of a cleaner-cut surface and a cheaper saw both in first cost and maintenance. As a result of the clean cut and consequent less face friction on the saw a quicker rate of feed is permissible with the same expended power as is used in existing saws. The common practice in saws of this class is to provide a tooth of V shape, "hooked" or angled forward at the point or apex of the V, and the teeth are sharpened from their cutting-faces at an acute angle backward, so that the cutting edge of each tooth is only down this cutting-face and not at all across its thickness. This fault is accentuated by the fact that as the cutting angle is reversed in the adjacent teeth in grinding the cutting edge of the tooth behind the back of each tooth is ground with a reverse angle, and where the two ground faces join toward the apex of the tooth a very fine point is left. A saw so ground will when sharp cut keenly toward the faces of the saw or sides of the saw-cut; but the material between (see dot-and-dash lines in the left-hand cut in Fig. 4) will not only not be cut away, but the obtuse angle of each tooth cross-section will very imperfectly roll the sawdust broken from the cut faces instead of cutting and throwing it into the gap between the teeth. To obviate this defect in what may be termed "side-cutting saws," some have introduced a drag-tooth the object of which is merely to clear the center portion of the cut; but although the device is effective the saw is a comparatively expensive one to cut and grind and the acute side-cutting edges of the others have the inherent defect of such—viz., the rapidity with which they are dulled and the extent of the damage which they receive on meeting a hard obstacle—for although side-cutting saw-teeth will produce a clean cut while the edges are fresh ground and sharp the acute cutting edge is soon dulled, and particularly so at the extreme point where the reverse grinding of front and back meet, and the cutting edge is insufficiently backed with metal, so that after running a very short time the teeth are not cutting but tearing the wood away. This fact is especially noticeable in crosscutting a soft wood, such as cedar, and particularly so when the wood is wet. The harder more brittle portions which form the annular grain of the wood will be seen to be cut through fairly clean, while the intervening soft portions are torn out, leaving an extremely rough cut, and to avoid the consequent face friction on the saw the teeth require an excessive "set" which does not improve the quality of the cut. The extremely acute angle and insufficient backing of the cutting edges of the saw-teeth when ground in the manner described also render them liable to considerable damage when they encounter a hard knot, stone, or spike, such as are not uncommon in cutting up cedar for a shingle-mill.

These faults in existing practice have been removed in the invention which is the subject of this application by shaping and grinding the teeth in the manner described in the following specification, reference being made to the drawings which accompany it, in which—

Figure 1 shows the profile of the teeth. Fig. 2 is a plan view of the same portion; Fig. 3, a cross-section of the same. Fig. 3ª is a detail view of the upper end of a pair of adjacent teeth, and Fig. 4 a cross-section of the saw-cuts in wood.

In my method of forming and grinding a saw simple pillar-teeth 2 are formed of approximately uniform width in profile by cutting out the gaps 3 with the emery-wheel, the gaps being angled alternately to offer a moderately acute cutting edge 4 down the front edge of each tooth. The tops 5 of the teeth are ground straight across, but slope down backward from the front face to a sufficient extent to afford clearance for an ample rate of feed, which grinding leaves a cutting edge 6 across the whole thickness of the saw-tooth and sloping downward and backward from the extreme point of the cutting-face, due to the combined angle of the gap-grinding 3 and that of the backward drop of the top grinding 5. A very slight set may be given which is shown exaggerated in the drawings, as the cut is so clean as to render set hardly necessary. The extreme simplicity of the form and manner of grinding of this tooth is a strong argument in its favor, as all the work is directly mechanical and performed by a simple direct movement of an emery-wheel of uniform thickness equal to the gap and passed across the saw at the desired alternate angles without handling or manipulating.

The action of the saw in cutting (see the right-hand cut in Fig. 4) is as simple and direct as the tooth, the work being cleanly done by the outer end of the edge 4 and the edge 6, a triangular section 7 being removed by each succeeding tooth when working to its extreme advantageous limit, and no chance is afforded for the sawdust to roll in the cut.

The substantial manner in which the cutting edges are backed up enables them to last a long time without grinding, and as they are not extremely acute they are not liable to receive serious damage when they come in contact with a metal spike or a fragment of rock. Further, when the edge is dulled or damaged it is much more quickly restored than if its cutting edges were extremely acute.

Having now particularly described my invention and the manner of its operation, I hereby declare that what I claim as new, and desire to be protected in by Letters Patent, is—

A saw comprising uniformly-constructed teeth the side faces of which being flat and the side faces of each tooth being parallel with each other, the thickness faces of each tooth being ground to moderately acute and opposite angles reversed on adjacent teeth to form U-shaped passages between the adjacent teeth and extending at an angle to the faces of the saw, the adjacent thickness faces of adjacent teeth being parallel to each other, the bottom of the passages being semicircular and extending horizontally across the saw, the passages between adjacent alternate pairs of teeth being disposed at opposite equal angles to the plane of the saw-body, the upper face of each tooth being disposed in parallel planes extending at right angles to the face of the saw and slightly sloping from the front to the back of the teeth, substantially as shown and for the purposes specified.

In testimony whereof I have signed my name to this specification in the presence of two subscribing witnesses.

JOHN H. McLEAN.

In presence of—
ROWLAND BRITTAIN,
ELLICE WEBBER.